United States Patent Office 3,112,338
Patented Nov. 26, 1963

3,112,338
ESTERS OF HYDROXYBENZOIC ACIDS
Edgar J. Smutny, San Francisco, and Paul H. Williams, Orinda, Calif., assignors to Shell Oil Company, New York, N.Y., a corporation of Delaware
No Drawing. Filed Feb. 13, 1961, Ser. No. 88,600
2 Claims. (Cl. 260—473)

This invention relates to novel esters of hydroxybenzoic acids and to the preparation. More particularly, it relates to novel alkyl and aromatic esters of such acids.

Most organic resinous polymers undergo degradation on exposure to actinic radiation with consequent loss of their desirable physical and chemical properties. Particularly susceptible to such degradation are the polyolefins, such as polyethylene and polypropylene. Upon irradiation by light from the sun or from sources of ultraviolet radiation, the polyolefins undergo rapid degradation which results from ultraviolet radiation-induced oxidation. The result is rapid embrittlement and discoloration of the plastic.

Until recently, carbon black was the only light stabilizer available to manufacturers of polyolefins. None of the commercial ultraviolet stabilizers was compatible with, for example, polyethylene. Recently, compatible stabilizers have been developed, but many of these tend to discolor the composition containing them. Furthermore, not all ultraviolet absorbers are sufficiently non-volatile to permit their inclusion in polyolefin compositions by hot milling or Banburying.

It is an object of this invention to provide a new class of compounds having superior light stabilizing properties. Another object is the provision of a class of esters characterized by excellent compatibility and non-discoloring properties in polyolefins. Still another object of the invention is the provision of comparatively non-volatile ultraviolet stabilizers for resinous materials, while the preparation of such stabilizers is still another object. Other objects will be apparent from the following description of the invention.

These objects are accomplished in the invention by the ester wherein the acid moiety is that of 3,5-dialkyl-4-hydroxybenzoic acid, at least one of the alkyl groups being branched on the alpha carbon atom, and the ester moiety is that of an alcohol of up to four hydroxyl groups. Such compounds can be generally shown by the structure

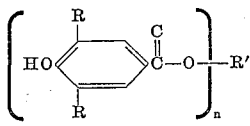

wherein each R is alkyl, at least one of the R's is branched on the alpha carbon atom; R' is a hydrocarbon or halo-substituted hydrocarbon n-valent radical, and $n$ is an integer from 1 to 6. Preferably, each R has no more than 8 carbon atoms. While R' may be acyclic or cyclic hydrocarbon and olefinically or aromatically unsaturated, it is preferably free from acetylenic unsaturation.

These esters may be prepared in a variety of ways. For example, they may be prepared by the liquid-phase reaction of 3,5-dialkyl-4-hydroxybenzoic acid with the appropriate alcohol, preferably in the presence of an esterification catalyst such as sulfuric acid or p-toluenesulfonic acid. Alternatively, they may be prepared by reacting the acid with the appropriate hydrocarbon chloride, preferably in the presence of a hydrogen chloride acceptor such as aniline. They may also be prepared by reaction of the alcohol with the suitable acid chloride.

The esters of the invention fall into the principal classes: those whose ester moiety is that of an alkanol having up to four hydroxyl groups, and those whose ester moiety is that of a phenol having up to four hydroxyl groups.

The first category is made up of those compounds wherein the radical R' is a saturated n-valent having only carbon atoms in the chain, having each hydroxyl group directly connected to a chain carbon atom, and wherein the only other atoms in the molecule and connected to the carbon chain are hydrogen and halogen atoms. Preferably, R' has no more than 20 carbon atoms.

When these compounds are prepared from monohydric alkanols, the esters preferably have the structure

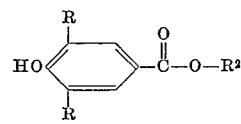

where each R has the significance noted above, and R² is alkyl or haloalkyl. Of course, the most effective and therefore the preferred esters are those wherein each R is branched on the alpha carbon atom.

Exemplary of such compounds are methyl 3-methyl-5-isopropyl-4-hydroxybenzoate; ethyl 3,5-diisopropyl-4-hydroxybenzoate; propyl 3,5-di-sec-butyl-4-hydroxybenzoate; isobutyl 3,5-di-tert-amyl-4-hydroxybenzoate; amyl 3,5-di-tert-heptyl-hydroxybenzoate; decyl 3,5-di-tert-octyl-4-hydroxybenzoate and cyclohexyl 3,5-di-tert-amyl-4-hydroxybenzoate. Especially non-volatile are the saturated fatty alcohol esters of 3,5-dialkyl-4-hydroxybenzoic acid, e.g., lauryl 3-methyl-5-isoamyl-4-hydroxybenzoate; stearyl 3,5-diisopropyl-4-hydroxybenzoate; and palmityl 3,5-di-tert-butyl-4-hydroxybenzoate. Effective both as light stabilizers and as fire-retardant additives are the esters of halogenated alcohols, e.g., chloromethyl 3,5-di-tert-butyl-4-hydroxybenzoate; 1,2-dibromoethyl 3,5-diisopropyl-4-hydroxybenzoate; 3-fluoropropyl 3,5-di-tert-amyl-4-hydroxybenzoate, and the like.

The esters of the invention may also be those of hydrocarbon acyclic or cyclic olefinically unsaturated monohydric or polyhydric alcohols and the 3,5-dialkyl-4-hydroxybenzoic acids described. In such a case, the radical R' in the above structure is hydrocarbon olefinically unsaturated, wherein the molecule has up to 20 carbon atoms in the chain and the only substitutents are hydroxyl, hydrogen and halogen. While any degree of olefinic unsaturation is acceptable in the ester, it is preferred that the ester have two and most preferably one olefinically unsaturated bond in the ester moiety. Alcohols which may be employed in the preparation of these esters include allyl alcohol, crotyl alcohol, cyclohexenol, methallyl alcohol, oleyl alcohol, and the like. The resulting esters are excellent light stabilizers and readily compatible with plastic compositions. They have the added advantage that they may be copolymerized into vinylic compositions, such as styrene or methyl methacrylate formulations.

Representative esters include allyl 3,5-di-tert-butyl-4-hydroxybenzoate; 2-butenyl 3,5-diisopropyl-4-hydroxybenzoate; oleyl 5-methyl-5-tert-amyl-4-hydroxybenzoate; 3-cyclohexenyl 3,5-di-sec-heptyl-4-hydroxybenzoate; and their halogenated isomers.

The dibenzoates of alkylene glycols are also extremely good light stabilizers for polyolefins. These compounds preferably may be represented by the structure

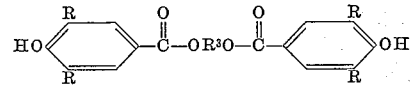

where each R has the above significance and R³ is alkene, alkylene or haloalkylene. These compounds are prepared by esterification of such glycols as ethylene glycol, propylene glycol, 1,6-hexanediol, and the like. While R' may have up to 20 carbon atoms, preferred dibenzoates are those where R' has from 2 to 10 carbon atoms. Exemplary compounds include ethane-1,2 di(3,5-diisopropyl-4-hydroxybenzoate); propane-1,3 di(3,5-di-tert-amyl-4-hydroxybenzoate); pentane-1,5 di(3-5-di-tert-octyl-4-hydroxybenzoate); and hexane-1,5 di(3-methyl-5-tert-butyl-4-hydroxybenzoate), as well as 2-chloropropane-1,3 di(3,5-di-tert-butyl-4-hydroxybenzoate).

Tri-, tetra-, penta- and hexabenzoates of such polyols as glycerol, 1,2,6-hexanetriol, trimethylolethane, trimethylol propane, sorbitol and pentaerythritol are also useful, particularly in view of their extremely low volatility and excellent compatibility in polyolefins.

Alternatively, esters having reduced volatility coupled with superior light-stabilizing properties may be prepared from 3,5-dialkyl-4-hydroxybenzoic acid and phenols having up to 20 carbon atoms, e.g., phenol, the cresols, the xylenols, durenol, p-octylphenol, naphthol and the like; hydroquinone; 3,5-dimethyl hydroquinone, resorcinol, catechol, 2,6-dihydroxynaphthalene, 9,10-dihydroxyanthracene, phloroglucinol, pyrogallol, thymol, and the like. For compatibility, it is preferred that the aromatic ring or rings be made up entirely of carbon atoms, the only substituents on the ring being hydroxyl groups, hydrogen atoms or alkyl groups.

The esters of phenols are those having the structure

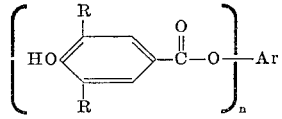

wherein each R has the significance noted above, Ar is a hydrocarbon or halohydrocarbon n-valent radical, and n is an integer from 1 to 4. Preferred substituents on the aromatic radical Ar are alkyl, while it is desirable that the radical have no more than three fused rings. Most preferably, the aryl, haloaryl or alkaryl radical should have no more than 20 carbon atoms.

While hydroxy aromatic compounds wherein the hydroxyl group is directly connected to a ring carbon atom, e.g., phenol, are preferred, hydroxy aromatic compounds wherein the hydroxyl group is attached to an alkyl substituent, e.g., benzyl alcohol, are also effective. Preferred compounds of this class have the formula

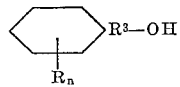

wherein R and R³ and n have the above meanings.

Such aryl benzoates are represented by phenyl 3,5-diisopropyl-4-hydroxybenzoates; p-octylphenyl 3,5-di-tert-amyl-4-hydroxybenzoate; 2',4'-dimethylphenyl 3,5-di-tert-octyl-4-hydroxybenzoate; and p-isopropylphenyl 3-methyl-5-tert-amyl-4-hydroxybenzoate, as well as naphthyl 3,5-di-tert-butyl-4-hydroxybenzoate; 6-methylnaphthyl 3,5-di-tert-hexyl-4-hydroxybenzoate, and the like. Also excellent light stabilizers for polyolefins are naphthalene-1,4-di-(3,5-di-tert-butyl-4-hydroxybenzoate; naphthalene-2,7-di-(3,5-di-tert-butyl-4-hydroxybenzoate); benzene-1,3,5-tri-(3,5-diisopropyl-4-hydroxybenzoate); benzene-1,2-di(3,5-di-tert-amyl-4-hydroxybenzoate); and anthracene-9,10-di-(3,5-di-tert-hexyl-4-hydroxybenzoate).

Characterized by fire-retardant properties are such chloroaromatic esters as p-chlorophenyl 3,5-di-tert-butyl-4-hydroxybenzoate; 2,4-dibromophenyl 3,5-diisopropyl-4-hydroxybenzoate, and the like.

The benzoate esters of the invention are generally white or light-colored crystalline solids at room temperature. A pointed out above, they are readily compatible with polyolefins and may be incorporated therein by Banburying, hot milling or other conventional methods. Not only do these esters impart superior actinic stability to the resulting polyolefin composition but they are non-coloring or discoloring. As a consequence, they are particularly suitable for use in transparent, white or light-colored resin formulations.

The following examples will illustrate the nature and advantages of the compounds of the invention. It should be understood, however, that the examples are merely illustrative and are not to be regarded as limitations to the appended claims, since the basic teachings thereof may be varied at will as will be understood by one skilled in the art.

EXAMPLE I

Substantially equimolar amounts of the acid chloride of 3,5-di-tert-butyl-4-hydroxybenzoic acid and p-octylphenol were heated together on a steam bath until melted and resolidified. At the end of that time the unreacted starting materials were separated from the reaction mixture, and the product recrystallized from Skelly B or ether.

In this way, a 70% yield of a white crystalline solid having a melting point of 149–151° C. was obtained. Upon analysis, it proved to be p-octylphenyl 3,5-di-tert-butyl-4-hydroxybenzoate having the following analysis:

|  | C | H |
|---|---|---|
| Calculated for $C_{29}H_{42}O_3$ | 79.4 | 9.7 |
| Found | 79.2 | 9.6 |

Naphthalene-2,7-di(3,5-di-tert-butyl-4-hydroxybenzoate) is prepared in the same manner.

EXAMPLE II

Using the above procedure, 3,5-di-tert-butyl-4-hydroxybenzoyl chloride was reacted with 2,4-di-tert-butylphenol.

A 70% yield of 2',4'-di-tert-butylphenyl 3,5-di-tert-butyl-4-hydroxybenzoate was obtained. The ester had a melting point of 191–192° C. and the following analysis:

|  | C | H |
|---|---|---|
| Calculated for $C_{29}H_{42}O_3$ | 79.4 | 9.7 |
| Found | 79.5 | 9.5 |

EXAMPLE III

Using the method of Example I, the dodecyl ester of 3,5-di-tert-butyl-4-hydroxybenzoic acid was prepared from dodecyl alcohol. The ester is a waxy solid having a melting point of 51–56° C. and the following analysis:

|  | C | H |
|---|---|---|
| Calculated for $C_{23}H_{46}O_3$ | 77.4 | 11.1 |
| Found | 76.9 | 11.3 |

Allyl 3,5-diisopropyl-4-hydroxybenzoate is readily prepared in the same manner, M.P. 70–72° C.

EXAMPLE IV

Using the method of Example I, trimethylene glycol was reacted with a substantial stoichoimetric excess of 3,5-di-tert-butyl-4-hydroxybenzoyl chloride. The product obtained was propane-1,3-di(3,5-di-tert-butyl-4-hydroxybenzoate). The diester was a white crystalline solid having a melting point of 140–141° C. and the following analysis:

|  | C | H |
|---|---|---|
| Calculated for $C_{33}H_{48}O_6$ | 73.3 | 8.9 |
| Found | 73.4 | 9.0 |

EXAMPLE V

Using the method of Example I above, 3,5-di-tert-butyl-4-hydroxybenzoyl chloride was reacted with 1,1,1- trichloro-2-methyl-2-propanol. The product, 1',1'-dimethyl-2',2',2'-trichloroethyl 3,5-di-tert-butyl-4-hydroxybenzoate, having a melting point of 145–146° C., was obtained in 68% yield.

|  | C | H |
|---|---|---|
| Calculated for $C_{19}H_{21}O_3Cl_3$ | 55.6 | 6.6 |
| Found | 55.4 | 6.7 |

EXAMPLE VI

As in Example I, trimethylolethane was reacted with 3,5-di-tert-butyl-4-hydroxybenzoyl chloride. The product triester, 1,1,1 - tri(3,5-di-tert-butyl-4-hydroxybenzoyloxymethyl)ethane, was obtained in 30% yield. The compound was a white crystalline solid having a melting point of 188–191° C. and the following analysis:

|  | C | H |
|---|---|---|
| Calculated for $C_{50}H_{22}O_9$ | 73.4 | 8.9 |
| Found | 73.5 | 8.9 |

The benzyl alcohol ester, benzyl 3,5-di-tert-butyl-4-hydroxybenzoate, is prepared in the same manner, M.P. 87–89° C.

EXAMPLE VII

Samples of the esters prepared above were evaluated as light stabilizers in polypropylene.

A series of plastic compositions were prepared by milling samples of polypropylene for five minutes at 190° C. with samples of the following compounds. From these compositions, compression molded films of about 5 mil thickness were formed, and these films were exposed to ultraviolet irradiation in a modified Atlas Weatherometer. In the modified instrument, the conventional arc light source was supplemented with eight fluorescent ultraviolet sources. All film samples passed within a quarter inch of the light sources. It has been found in this accelerated test conditions are about eight times as stringent as in the unmodified Weatherometer.

The samples were periodically tested by bending through 180°. The number of days required before each film broke on bending is shown in the following table.

The samples tested each contained 0.5% w. of the candidate stabilizer. The samples also contained 0.1% w. of an antioxidant, bis(3,5-di-tert-butyl-4-hydroxybenzyl) durene. Two different types of polypropylene were tested.

*Table I*

| Additive | Days to failure | |
|---|---|---|
|  | Sample 1 | Sample 2 |
| None | 4.5 | 4.5 |
| 2',4'-Di-t-butylphenyl 3,5-di-t-butyl-4-hydroxybenzoate | 10 | 20.5 |
| Lauryl 3,5-di-t-butyl-4-hydroxybenzoate | 8.5 | 13.5 |
| Propane 1,3-bis(3,5-di-t-butyl-4-hydroxybenzyl)benzoate | 14 | 14 |
| p-Octylphenyl 3,5-di-t-butyl-4-hydroxybenzoate |  | 20.5 |

Similar results are obtained when these compounds are incorporated in polyethylene. The polyolefin compositions tested do not discolor on aging.

We claim as our invention:
1. p-Octylphenyl 3,5-di-tert-butyl-4-hydroxybenzoate.
2. 2,4-di-tert-butylphenyl 3,5 - di-tert-butyl-4-hydroxybenzoate.

References Cited in the file of this patent

UNITED STATES PATENTS

| 2,079,487 | Carswell | May 4, 1937 |
| 2,198,582 | Grether et al. | Apr. 23, 1940 |
| 2,350,326 | DeVall et al. | June 6, 1944 |
| 2,464,172 | Britton et al. | Mar. 8, 1949 |
| 2,910,454 | Clark et al. | Oct. 27, 1959 |
| 3,029,276 | Hausweiler et al. | Apr. 10, 1962 |

OTHER REFERENCES

Cohen, J. Org. Chem., 22, 1333–5 (1957).